(12) United States Patent
Iverson et al.

(10) Patent No.: US 9,856,169 B2
(45) Date of Patent: *Jan. 2, 2018

(54) LOST CIRCULATION COMPOSITIONS COMPRISING PUMICE AND ASSOCIATED METHODS

(71) Applicant: Halliburton Energy Services, Inc., Houston, TX (US)

(72) Inventors: Benjamin John Iverson, Zionsville, IN (US); Thomas Jason Pisklak, Cypress, TX (US); Ronnie Glen Morgan, Waurika, OK (US); Kyriacos Agapiou, Houston, TX (US); Lance Everett Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,491

(22) Filed: Oct. 24, 2016

(65) Prior Publication Data

US 2017/0036959 A1 Feb. 9, 2017

Related U.S. Application Data

(60) Division of application No. 14/202,625, filed on Mar. 10, 2014, now Pat. No. 9,505,972, which is a continuation-in-part of application No. 13/417,001, filed on Mar. 9, 2012, now Pat. No. 8,851,173.

(51) Int. Cl.
| | |
|---|---|
| *C04B 28/18* | (2006.01) |
| *C04B 24/00* | (2006.01) |
| *C09K 8/487* | (2006.01) |
| *E21B 33/13* | (2006.01) |
| *C04B 40/06* | (2006.01) |
| *C09K 8/467* | (2006.01) |
| *C04B 22/16* | (2006.01) |
| *C04B 103/12* | (2006.01) |
| *C04B 103/22* | (2006.01) |

(52) U.S. Cl.
CPC ............ *C04B 24/003* (2013.01); *C04B 22/16* (2013.01); *C04B 28/18* (2013.01); *C04B 40/0658* (2013.01); *C09K 8/467* (2013.01); *C09K 8/487* (2013.01); *E21B 33/13* (2013.01); *C04B 2103/12* (2013.01); *C04B 2103/22* (2013.01)

(58) Field of Classification Search
CPC ....... C04B 12/04; C04B 14/062; C04B 14/16; C04B 22/0013; C04B 22/0062; C04B 22/124; C04B 22/147; C04B 22/148; C04B 22/16; C04B 24/04; C04B 24/003; C04B 24/122; C04B 24/163; C04B 24/18; C04B 24/226; C04B 24/2647; C04B 24/383; C04B 40/0658; C04B 2103/12; C04B 2103/22; C04B 2103/30; C04B 2103/408; C09K 8/467; C09K 8/487; E21B 33/13

See application file for complete search history.

(56) References Cited

U.S. PATENT DOCUMENTS

| | | | |
|---|---|---|---|
| 3,238,279 A | * | 3/1966 | Tarlton ................ C04B 40/024 106/740 |
| 3,557,876 A | | 1/1971 | Tragesser |
| 3,887,009 A | | 6/1975 | Miller et al. |
| 3,959,003 A | | 5/1976 | Ostroot et al. |
| 4,515,216 A | | 5/1985 | Childs et al. |
| 4,519,452 A | | 5/1985 | Tsao et al. |
| 4,524,828 A | | 6/1985 | Sabins et al. |
| 4,676,832 A | | 6/1987 | Childs et al. |
| 4,818,288 A | | 4/1989 | Aignesberger et al. |
| 4,875,937 A | | 10/1989 | Viles |
| 4,964,465 A | | 10/1990 | Surles |
| 5,058,679 A | | 10/1991 | Hale et al. |
| 5,263,542 A | | 11/1993 | Brothers |
| 5,447,197 A | | 9/1995 | Rae et al. |
| 5,547,506 A | | 8/1996 | Rae et al. |
| 6,173,778 B1 | | 1/2001 | Rae et al. |
| 6,279,655 B1 | | 8/2001 | Pafitis et al. |
| 6,457,523 B1 | | 10/2002 | Vijn et al. |
| 6,610,140 B2 | | 8/2003 | Vijn et al. |
| 6,907,928 B2 | | 6/2005 | Di Lullo Arias et al. |
| 6,908,508 B2 | | 6/2005 | Brothers |
| 7,006,183 B2 | | 2/2006 | Johnson et al. |
| 7,086,466 B2 | | 8/2006 | Roddy et al. |
| 7,199,086 B1 | | 4/2007 | Roddy et al. |
| 7,201,798 B2 | | 4/2007 | Brothers et al. |
| 7,284,611 B2 | | 10/2007 | Reddy et al. |
| 7,338,923 B2 | | 3/2008 | Roddy et al. |
| 7,478,675 B2 | | 1/2009 | Roddy et al. |
| 7,559,369 B2 | | 7/2009 | Roddy et al. |
| 7,575,055 B2 | | 8/2009 | Reddy et al. |
| 7,617,870 B1 | | 11/2009 | Roddy et al. |

(Continued)

FOREIGN PATENT DOCUMENTS

| | | |
|---|---|---|
| CA | 2866602 | 9/2013 |
| JP | 02286781 | 11/1990 |
| WO | 9620899 | 7/1996 |
| WO | 2015034477 | 3/2015 |

OTHER PUBLICATIONS

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.

(Continued)

Primary Examiner — Anthony J Green
(74) Attorney, Agent, or Firm — Craig W. Roddy; Tumey L.L.P

(57) ABSTRACT

Disclosed are lost circulation treatment fluids and methods of sealing lost circulation zones. Embodiments include a lost circulation treatment fluid comprising pumice, hydrated lime, a set retarder, and water.

15 Claims, 3 Drawing Sheets

(56) References Cited

U.S. PATENT DOCUMENTS

| | | | |
|---|---|---|---|
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,851,173 B2* | 10/2014 | Brothers | C04B 28/18 106/792 |
| 8,899,329 B2* | 12/2014 | Chatterji | C09K 8/467 166/293 |
| 9,212,534 B2* | 12/2015 | Ballew | C04B 28/18 |
| 9,227,872 B2* | 1/2016 | Pisklak | C09K 8/428 |
| 9,255,031 B2* | 2/2016 | Pisklak | C04B 40/065 |
| 9,255,454 B2* | 2/2016 | Lewis | E21B 21/01 |
| 9,260,343 B2* | 2/2016 | Brothers | C04B 16/00 |
| 9,328,583 B2* | 5/2016 | Pisklak | C04B 28/18 |
| 9,346,711 B2* | 5/2016 | Chatterji | C04B 22/00 |
| 9,371,712 B2* | 6/2016 | Boul | C04B 28/18 |
| 9,505,972 B2* | 11/2016 | Iverson | C04B 28/18 |
| 9,534,165 B2* | 1/2017 | Agapiou | C04B 28/18 |
| 9,580,638 B2* | 2/2017 | Boul | C04B 28/18 |
| 2004/0023815 A1 | 2/2004 | Burts | |
| 2004/0211342 A1 | 10/2004 | Sprouts et al. | |
| 2006/0166834 A1 | 7/2006 | Roddy | |
| 2009/0105099 A1* | 4/2009 | Warrender | C09K 8/467 507/269 |
| 2009/0124522 A1 | 5/2009 | Roddy | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0258312 A1 | 10/2010 | Brenneis et al. | |
| 2010/0273912 A1 | 10/2010 | Roddy et al. | |
| 2010/0282466 A1* | 11/2010 | Brenneis | C04B 28/021 166/293 |
| 2010/0292365 A1* | 11/2010 | Roddy | C04B 28/02 523/130 |
| 2011/0132605 A1 | 6/2011 | Sarap et al. | |
| 2011/0162845 A1 | 7/2011 | Ravi | |
| 2011/0265996 A1* | 11/2011 | Lewis | C04B 28/02 166/292 |
| 2012/0090841 A1 | 4/2012 | Reddy et al. | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi et al. | |
| 2012/0211227 A1 | 8/2012 | Thaemlitz | |
| 2013/0233550 A1 | 9/2013 | Brothers et al. | |
| 2013/0248183 A1 | 9/2013 | Pisklak et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lowio et al. | |
| 2014/0048267 A1 | 2/2014 | Pisklak et al. | |

OTHER PUBLICATIONS

Rae et al., "Liquid Cement Premix Introduces New Solutions to Conventional Cementing Problems", IADC/SPE 35086, pp. 393-400, IADC/SPE Drilling Conference, 1996.

Rae et al., "Liquid Cement Premix for Improved Abandonment and Workover Operations", SPE 36477, pp. 637-643, SPE, Inc., 1996.

Anderson et al., "New Technology Eliminates Bulking in Cementing Operations", SPE 36478, pp. 645-653, SPE, Inc., 1996.

Anderson et al., "New Technology Improves Cement Slurry Design", SPE 36973, pp. 127-136, SPE, Inc., 1996.

Shaefer et al., "Utilizing 'Over-Seas' Technology Improves the Cementing Processes in the DJ Basin of Colorado", SPE 80940, pp. 1-8, SPE, Inc., 2003.

"Liquid Stone® Cement Technology", Product Sales Bulletin, BJ Services Company, pp. 1-2, Oct. 19, 2004.

HES brochure "Micro Matrix® Cement Retarder", H01481, Aug. 2007.

HES brochure "CFR-3™ Cement Friction Reducer", H01325, Oct. 2005.

Hess Pumice Products, Inc., "Fact Sheet", located at website www.hesspumice.com, printed from Internet Mar. 2012.

PCT Search Report for PCT International Application No. PCT/US2013/029489 dated Apr. 19, 2013.

PCT Written Opinion for PCT International Application No. PCT/US2013/029489 dated Apr. 19, 2013.

"Conduction Calorimetric Investigation of the effect of Retarders on the Hydration of Portland Cement", V.S. Ramachandran and M.S. Lowery—Themnochimica Arts, 195 (1992) 373-387.

"Competitive Adsorption of Phosphate and Phosphonates onto Goethite", Bernd Nowack and Alan T. Stone—Water Research 40 (2006) 2201-2209.

"Molecular Modeling of the Mechanism of Action of Phosphonate Retarders on Hydrating Cements", Peter V. Coveney and William Humphries—J. Chem. Soc., Faraday Trans., 1996, 92(5, 831-841).

Yana, Y. et al., (1996). "Growth and Engineering of Microporous Zeolite Films and Coatings." MRS Proceedings, 431, p. 211.

Malvern Brochure "Zetasizer Nano ZS" dated 2011.

Nissan Chemical Brochure "Snowtex®" dated 2007.

ThermPhos Brochure "Dequest® 2006" printed from the Internet on Mar. 25, 2013.

OFI Testing Equipment, Inc. Brochure "Ultrasonic Cement Analyzer" dated 2013.

HESS Brochure "Pumice Pozz for Well Cements" dated 2013.

BASF Brochure "Oilfield Chemicals Product Range" dated Jul. 2010.

Halliburton Brochure "Micro Matrix®" dated Nov. 2006.

TherrnPhos Brochure "Dequest® 2066" printed from the Internet on Nov. 18, 2013.

Benge, O.G. et al., "Evaluation of Blast Furnace Slag Slurried for Oilfield Application" SPE 27449, pp. 169-180, SPE, Inc., 1994.

Halliburton Brochure "Barold" dated Mar. 25, 2010.

Allahverdi, A. et al., (2006). "Chemical activation and set acceleration of lime-natural pozzolan cement." Ceramics-Silikaty, 193-199.

Brito, A. et al., (2004). "High surface area support, catalyst derived from natural pumice." Study of pretreatment variables Ind. Eng. Chem. Res., 443, 1659-1664.

Johnson, C.D. et al., (2007). "Zeolitisation of pumice-microporous materials on macroporous support structures derived from natural minerals." J. Mat. Chem., 17, 476-484.

Mielenz, R.C. et al., (1950). "Effect of calcination on natural pozzolans." Symposium on use of pozzolanic materials in mortars and concretes (pp. 43-92). ASTM.

Ottana, R. et al., (1982). "Hydrothermal synthesis of zeolites from pumice in alkaline and saline environment." Zeolites, 2, 295-298.

Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.

Pisklak, T.J. et al., (2004). "Preparation and characterization of mordenite thin films via pulsed laser deposition." Journal of Porous Materials, 11(4), 191-209.

Rebrov, E.V. et al., (2009). "Sol-gel synthesis of zeolite coatings and their application in catalytic microstructured reactors." Catalysis in Industry, 1(4), 322-347.

Saija, L.M. et al., (1983). "Zeolitization of pumice in ash-sodium salt solutions." Mat. Chem. Phys., 8, 207-216.

(56) References Cited

OTHER PUBLICATIONS

Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
U.S. Appl. No. 14/090,494, filed Nov. 26, 2013.
V-Mar 3 Concrete Rheology-Modifying Admixture Product Description available from Grace Construction at http://www.na.graceconstruction.com/ viewed on Oct. 2013.
Southern Clay Products Data Sheet for LAPONITE RD, available from http://www.rockwoodadditives.com/ and viewed on Oct. 2013.
Daxad 19 MSDS, available from Geo Specialty Chemicals at http://www.geosc.com/ and last revised Sep. 20, 2013.
Liquiment 55811 Product Description available from BASF at http://www.oilfield-solutions.basf.com/ viewed on Oct. 2013.
Ethacryl G Product Description available from Arkema at http://www.arkema.com/ viewed on Oct. 2013.
SA-1015 Suspending Agent Product Description available from Halliburton Energy Services at http://www.halliburton.com/ viewed on Oct. 2013.
WellLife 684 Additive Product Description available from Halliburton Energy Services at http://www.halliburton.com/ viewed on Oct. 2013.
Halad-344 Fluid Loss Additive Product Description available from Halliburton Energy Services at http://www.halliburton.com/ viewed on Oct. 2013.
Halliburton brochure for "SentinelCem Cement" dated May 2012.
ZoneSealant™ 2000 Agent Product Description available from http://www.halliburton.com/ viewed on Mar. 2014.
D-Air Defoamer Product Line Description available from http://www.halliburton.com/ viewed on Mar. 2014.
Australian Examination Report No. 2 for Application No. 2015229584 dated Jan. 24, 2017.
How Microsilica Improves Concrete, Publication #C850327. Copyright 1985, The Aberdeen Group.
Non-final Rejection for Application No. 15087961 dated Apr. 17, 2017.
Japanese Office Action and translation for Application No. JP 2016-542688 dated Aug. 8, 2017.
Canadian Office Action for Application No. 2,933,565 dated Sep. 14, 2017.

* cited by examiner

LOST CIRCULATION COMPOSITIONS COMPRISING PUMICE AND ASSOCIATED METHODS

CROSS-REFERENCE TO RELATED APPLICATIONS

This application is a divisional of U.S. patent Ser. No. 14/202,625, now U.S. Pat. No. 9,505,972 titled "Lost Circulation Treatment Fluids Comprise Pumice and Associated Methods," filed on Mar. 10, 2014, which is a continuation-in-part of U.S. patent application Ser. No. 13/417,001, now U.S. Pat. No. 8,851,173 titled "Set-Delayed Cement Compositions Comprising Pumice and Associated Methods," filed on Mar. 9, 2012, now U.S. Pat. No. 8,851,173, the entire disclosures of which are incorporated herein by reference.

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protect the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for an extended period of time (e.g., at least about 1 day to about 2 weeks or more). When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

Drilling requires the use of drilling fluid or as it is also known, drilling mud. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." In addition to drilling fluids, problems with lost circulation may also be encountered with other treatment fluids, for example, spacer fluids, completion fluids (e.g., completion brines), fracturing fluids, and cement compositions that may be introduced into a well bore.

The loss of treatment fluids into the formation is undesirable, inter alia, because of the expense associated with the treatment fluid lost into the formation, loss of time, in extreme conditions, well abandonment. Treatment fluid replacement does not just create operation downtime, but may also require additional fluid storage, additional manpower, and additional equipment. In addition to the increased operating expenses, fluid replacement may create additional worksite problems such as higher environmental burdens and the inability to recycle fluids and materials once their respective portion of the operation has been completed.

BRIEF DESCRIPTION OF THE DRAWINGS

These drawings illustrate certain aspects of some of the embodiments of the present method, and should not be used to limit or define the method.

DETAILED DESCRIPTION

Figure 1:
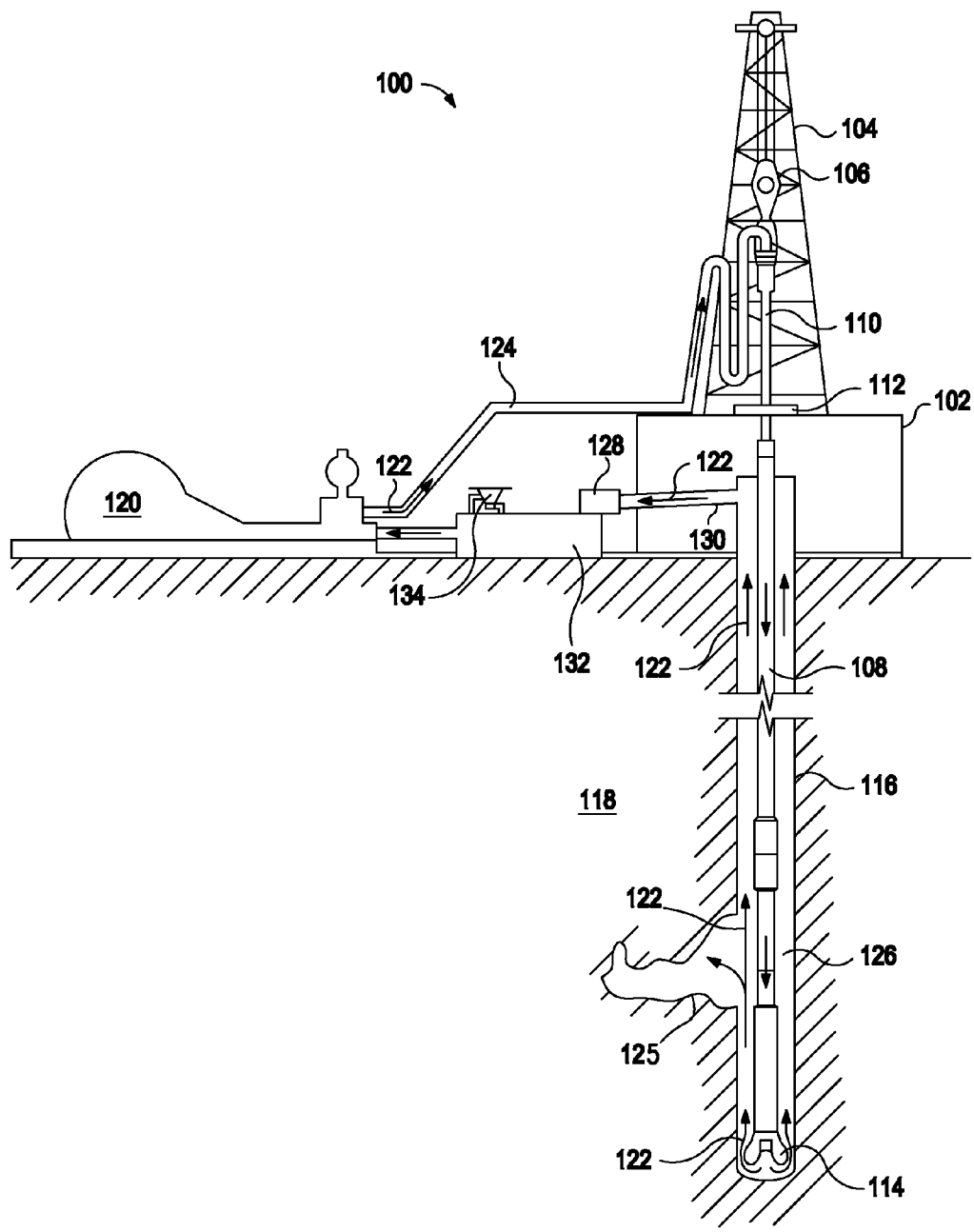
FIG. 1 illustrates a system for using a lost circulation treatment fluid while drilling equipment is present in a wellbore in accordance with certain embodiments.

The present embodiments relate to subterranean operations and, more particularly, in certain embodiments, to set-delayed cement compositions and methods of using set-delayed cement compositions in subterranean formations. Lost circulation fluids comprising set-delayed cement compositions may be used to prevent the loss of a variety of treatment fluids. One of the many potential advantages to these methods and compositions are that they may immediately plug off or bridge lost circulation zones by developing sufficient static gel strength in a short time frame to be effective at lost circulation control. Other advantages are that they may set to form a hardened mass, possess sufficient compressive strength to support well structures, may isolate subterranean zones, and may be thixotropic (e.g., shear-thinning or shear-sensitive) so that the fluids should remain pumpable long enough for placement, but when static, should develop gel strength quickly.

Embodiments of the set-delayed cement compositions may generally comprise water, pumice, hydrated lime, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable compressive strengths after activation. The set-delayed cement compositions may be suitable for a number of subterranean cementing operations, including those in subterranean formations having bottom hole static temperatures ranging from about 100° F. to about 450° F. or even greater. In some embodiments, the set-delayed cement composition may be used in subterranean formations having relatively low bottom hole static temperatures, e.g., temperatures less than about 200° F.

The water used in embodiments of the set-delayed cement compositions may be from any source, provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in certain embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that may exhibit cementitious properties, in that it may set and harden in the presence of hydrated lime and water. The pumice may also be ground, for example. Generally, the pumice may have any particle size distribution as desired for a particular application. In certain embodiments, the pumice may have a d50 particle size distribution in a range of from about 1 micron to about 200 microns. The d50 particle size distribution corresponds to d50 values as measured by particle size analyzers such as those manufactured by Malvern Instruments, Worcestershire, United Kingdom. In specific embodiments, the pumice may have a d50 particle size distribution in a range of from about 1 micron to about 200 micron, from about 5 microns to about 100 microns, or from about 10 micron to about 50 microns. In one particular embodiment, the pumice may have a d50 particle size distribution of about 15 microns or less. An example of a suitable pumice is available from Hess Pumice Products, Inc., Malad, Id., as DS-325 lightweight aggregate, having a d50 particle size distribution of about 15 microns or less. It should be appreciated that particle sizes too small may have mixability problems while particle sizes too large may not be effectively suspended in the compositions. One of ordinary skill in the art, with the benefit of this disclosure, should be able to select a particle size for the pumice suitable for use for a chosen application.

Embodiments of the set-delayed cement compositions may comprise hydrated lime. As used herein, the term "hydrated lime" will be understood to mean calcium hydroxide. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in embodiments of the set-delayed cement compositions. For example, the set retarder may comprise phosphonic acid, phosphonic acid derivatives, lignosulfonates, salts, organic acids, carboxymethylated hydroxyethylated celluloses, synthetic co- or ter-polymers comprising sulfonate and carboxylic acid groups, borate compounds, derivatives thereof, or mixtures thereof. Examples of suitable set retarders include, among others, phosphonic acid derivatives available from Halliburton Energy Services, Houston, Tex., as Micro Matrix® cement retarder. Generally, the set retarder may be present in the set-delayed cement composition in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants and polycarboxylated ether dispersants. One example of a sulfonated-formaldehyde-based dispersant that may be suitable is a sulfonated acetone formaldehyde condensate, available from Halliburton Energy Services, Houston, Tex., as CFR™-3 dispersant. One example of polycarboxylated ether dispersant that may be suitable is Liquiment® 514L dispersant, available from BASF Corporation, Houston, Tex., that comprises 36% by weight of the polycarboxylated ether in water. While a variety of dispersants may be used in accordance with certain embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. A person having ordinary skill in the art, with the benefit of this disclosure, will readily be able to determine the type and amount of additive useful for a particular application and desired result.

Optionally, foaming additives may be included in the set-delayed cement compositions to, for example, facilitate foaming and/or stabilize the resultant foam formed therewith. In particular, the cement compositions may be foamed with a foaming additive and a gas. The foaming additive may include a surfactant or combination of surfactants that reduce the surface tension of the water. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyl-tallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Optionally, strength-retrogression additives may be included in the set-delayed cement compositions to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Optionally, lightweight additives may be included in the set-delayed cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the set-delayed cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the set-delayed cement compositions to, for example, ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the set-delayed cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, melamine laminates (e.g., Foimica® laminate), corncobs, cotton hulls, and combinations thereof.

Optionally, fluid-loss-control additives may be included in the set-delayed cement compositions to, for example, decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, defoaming additives may be included in the set-delayed cement compositions to, for example, reduce tendency for the cement composition to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Optionally, thixotropic additives may be included in the set-delayed cement compositions to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, embodiments of the set-delayed cement compositions may rapidly develop static gel strength. For example, the set-delayed cement compositions may be characterized by a static gel strength of at least about 100 lb/100 ft$^2$ to about 500 lb/100 ft$^2$ at about 50 to about 200° F. By way of further example, the set-delayed cement compositions may be characterized by a static gel strength of at least about 200 lb/100 ft$^2$ to about 350 lb/100 ft$^2$ at about 50 to about 200° F.

As previously mentioned, the set-delayed cement compositions may have a delayed set in that they remain in a pumpable fluid state for an extended period of time. For example, the set-delayed cement compositions may remain in a pumpable fluid state at a temperature, for example, about 100° F., for a period of time from about 1 day to about 7 days or more. In some embodiments, the set-delayed cement compositions may remain in a pumpable fluid state at a temperature, for example, about 100° F., for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with a cement set activator) to thereby set into a hardened mass. By way of example, embodiments of the set-delayed cement compositions may be activated to set to form a hardened mass in a time period in the range of from about 2 hours to about 12 hours. For example, embodiments of the set-delayed cement compositions may set to form a hardened mass in a time period ranging between any of and/or including any of about 2 hours, about 4 hours, about 6 hours, about 8 hours, about 10 hours, or about 12 hours. After activation, the set-delayed cement composition may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. The compressive strengths may be determined in accordance with API RP 10B-2, *Recommended Practice for Testing Well Cements*, First Edition, July 2005, using an UCA at 140° F. while maintained at 3000 psi.

Embodiments may include addition of a cement set activator to the set-delayed cement compositions. Examples of suitable cement set activators include, but are not limited to, calcium chloride, triethanolamine, sodium silicate, zinc formate, calcium acetate, sodium hydroxide, a monovalent salt, nanosilica (i.e., silica having a particle size of less than or equal to about 100 nanometers), a polyphosphate, and combinations thereof. In some embodiments, a combination of the polyphosphate and a monovalent salt may be used for activation. The monovalent salt used may be any salt that dissociates to form a monovalent cation, such as sodium and potassium salts. Specific examples of suitable monovalent salts include potassium sulfate, calcium chloride, and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator should be added to embodiments of the set-delayed cement composition in an amount sufficient to activate the extended settable composition to set into a hardened mass. In certain embodiments, the cement set activator may be added to the set-delayed cement composition in an amount in the range of about 1% to about 20% by weight of the pumice. In specific embodiments, the cement set activator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of the cement set activator to include for a chosen application.

As will be appreciated by those of ordinary skill in the art, embodiments of the set-delayed cement compositions may be used in a variety of subterranean operations, including drilling, fluid displacement, and primary and remedial cementing. Collectively, these types of operations may use the set-delayed cement composition as a "treatment fluid." As used herein, the term "treatment," or "treating" fluid refers to any subterranean operation that uses a fluid in conjunction with a desired function and/or for a desired purpose. The term "treatment," or "treating," does not imply any particular action by the fluid.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

The set-delayed cement compositions may comprise properties that would be beneficial for use as a lost circulation treatment fluid. For example, the lost circulation composition may develop static gel strength in a short time frame enabling them to be effective at lost circulation control. By way of further example, the set-delayed cement compositions may set to form a hardened mass with sufficient compressive strength to support well structures. Additionally, the set-delayed cement compositions may be thixotropic (e.g., shear-thinning or shear-sensitive) so that the fluids should remain pumpable long enough for placement, but when static, should develop gel strength quickly.

Accordingly, embodiments provide a lost circulation treatment fluid that comprises a set-delayed cement composition. The lost circulation treatment fluid may be used in the course of drilling a wellbore in a subterranean formation; the lost circulation treatment fluid may comprise a set-delayed cement composition that may comprise: water, pumice, hydrated lime, a set retarder, and optionally a dispersant. The lost circulation treatment fluid further may comprise a cement set activator. The lost circulation treatment fluid may be used to reduce the loss of drilling fluid into the lost circulation zones of the subterranean formation. In further embodiments, the lost circulation treatment fluid may be used at any time and during any wellbore operation. The lost circulation fluid may be used to reduce the loss of any treatment fluid to any formation feature.

The lost circulation treatment fluid may be a thixotropic shear-thinning fluid. A thixotropic fluid is generally described as a fluid that becomes more viscous when flow ceases. It often may develop a gel that requires a sufficient shear stress to overcome this static gelling phenomenon, in order for flow to begin. Once flow begins, a shear thinning or pseudoplastic fluid is one whose apparent viscosity (apparent viscosity being defined as the ratio of shear stress to shear rate) decreases as shear rate increases. Dilatant (shear thickening) fluids are those whose apparent viscosity increases as shear rate increases. The Herschel-Bulkley (HB) fluid model can be used to viscometrically classify fluids both as shear-thinning (pseudoplastic) or shear thickening (dilatant). The HB model is expressed as:

$$\tau = \mu_\infty \gamma^n + \tau_0$$

Where $\tau$ is the shear stress, $\mu_\infty$ is the consistency coefficient of the fluid, $\gamma$ is the shear rate, n is the shear-thinning index, and $\tau_0$ is the yield stress. A shear-thinning index of less than 1 indicates that the fluid is shear-thinning, whereas a value of n that is greater than 1 indicates that the fluid is shear-thickening. Thus, a shear-thinning fluid must have a shear-thinning index of less than 1 when measured according to the Herschel-Bulkley model. The thixotropic and shear-thinning dual nature of lost circulation treatment fluids will therefore remain fluid while exposed to the agitation of pumping (or any other agitation), however, when the lost-circulation treatment fluid flows into a lost circulation zone and away from a source of agitation the lost circulation treatment fluid will thicken to seal the lost circulation zone and prevent fluid migration into the lost circulation zone of any fluid flowing adjacent to the sealed lost circulation zone.

In lost circulation treatment fluid embodiments, a lost circulation treatment fluid that comprises a set-delayed cement composition may be used. For example, the lost circulation treatment fluid embodiments comprise the formulations of the disclosed set-delayed cement composition described herein. In embodiments, the lost circulation treatment fluid may be comprised entirely of the set-delayed cement composition. Therefore, in embodiments, the disclosed set-delayed cement composition may be used to reduce the loss of a treatment fluid in a subterranean formation, e.g., by circulating the set-delayed cement composition while drilling a wellbore, the lost circulation treatment fluid may reduce the loss of drilling fluid to the lost circulation zones of a subterranean formation. An embodiment may provide a method of drilling a wellbore in a subterranean formation comprising: circulating a lost circulation treatment fluid comprising a set-delayed cement composition in the wellbore while drilling the wellbore, wherein the set-delayed cement composition comprises: pumice, hydrated lime, a set retarder, and water. In further embodiments, all or a portion of the set-delayed cement composition is permitted to set in the lost circulation zones of the subterranean formation.

In optional lost circulation treatment fluid embodiments, aluminum sulfate, i.e. $Al_2(SO_4)_3$, may be used to enhance the rheology of the lost circulation treatment fluid. This enhancement may be measured by application of the Herschel-Bulkley model described earlier, wherein the addition of aluminum sulfate induces a net decrease in the value of the shear-thinning index. The lost circulation treatment fluid may comprise aluminum sulfate in an amount of about 0.1% to about 10% by weight of the pumice. In specific embodiments, the aluminum sulfate may be present in an amount ranging between any of and/or including any of about 0.1%, about 0.5%, about 1%, about 2%, about 5%, about 7%, or about 10% by weight of the pumice. One of ordinary skill in the art, with the benefit of this disclosure, will recognize the appropriate amount of aluminum sulfate to include for a chosen application. Aluminum sulfate induces the formation of ettringite in the lost circulation treatment fluid. Without being limited by theory, it is believed that ettringite forms needle like crystals whose flow properties induce thixotropy because they align in a shear field and become randomized when static. Therefore, in embodiments, any other material that induces the formation of ettringite may be used in a manner similar to aluminum sulfate.

As previously mentioned, lost circulation zones are often encountered into which drilling fluid may be lost. As a result, drilling typically must be terminated with the implementation of remedial procedures, for example. In accordance with embodiments, the lost circulation treatment fluids may be used to seal the lost circulation zones to prevent the uncontrolled flow of treatment fluids into or out of the lost circulation zones, e.g., lost drilling fluid circulation, cross-flows, underground blow-outs and the like. In an embodiment, a lost circulation treatment fluid comprising a set-delayed cement composition may prepared. After preparation, the lost circulation treatment fluid may be introduced into the lost circulation zone. In an embodiment, the lost circulation treatment fluid is pumped through one or more openings at the end of the string of drill pipe. For example, the lost circulation treatment fluid may be pumped through the drill bit. Once placed into the lost circulation treatment fluid, the lost circulation treatment fluid should set to form a hardened mass inside the lost circulation zone. This hardened mass should seal the zone and control the loss of subsequently pumped drilling fluid, which allows for continued drilling. In addition to drilling fluids, embodiments of the lost circulation treatment fluids may also be used to control lost circulation problems encountered with other treatment fluids, for example, spacer fluids, completion fluids (e.g., completion brines), fracturing fluids, and cement compositions (set-delayed or otherwise) that may be placed into a wellbore.

A method of sealing a lost circulation zone may be provided. The method may comprise circulating a lost circulation treatment fluid in a wellbore, wherein the lost circulation treatment fluid comprises pumice, hydrated lime, a set retarder, and water; and allowing the lost circulation treatment fluid to set in the lost circulation zone to seal the lost circulation zone. The lost circulation treatment fluid used in this method of sealing the lost circulation may contain the various features of the embodiments of the lost circulation treatment fluid described herein.

A lost circulation treatment fluid may be provided. The lost circulation treatment fluid may comprise pumice, hydrated lime, a set retarder, and water. The lost circulation treatment fluid may contain the various features of the embodiments of the lost circulation treatment fluid described herein.

A system for sealing a lost circulation zone in a subterranean formation may be provided. The system may comprise a lost circulation treatment fluid for placement into the lost circulation zone. The lost circulation treatment fluid may comprise pumice, hydrated lime, and a set retarder. The lost circulation treatment fluid may further comprise mixing equipment capable of missing the lost circulation treatment fluid; and pumping equipment capable of pumping the lost circulation treatment fluid into the lost circulation zone.

FIG. 1 illustrates an example technique for the introduction of a lost circulation treatment fluid 122 comprising the set-delayed cement compositions disclosed herein into a lost circulation zone 125 while drilling equipment is present in a wellbore 116. Such an embodiment may be used, for example, when it is desired to reduce the loss of drilling fluid into a lost circulation zone 125. As such, the exemplary lost circulation treatment fluids which comprise the set-delayed cement compositions disclosed herein may directly or indirectly affect one or more components or pieces of equipment associated with the preparation, delivery, recapture, recycling, reuse, and/or disposal of the disclosed set-delayed cement compositions. For example, and with reference to FIG. 1, the lost circulation treatment fluids 122 may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates lost circulation treatment fluid 122 through a feed pipe 124 and to the kelly 110, which conveys the lost circulation treatment fluid 122 downhole through the interior of the drill string 108 and through one or more orifices in the drill bit 114. The lost circulation treatment fluid 122 may be introduced prior to, concurrently with, or subsequent to the introduction of a drilling fluid or other treatment fluid (not shown) into the wellbore. The lost circulation treatment fluid 122 may then contact lost circulation zone 125. The lost circulation treatment fluid 122 that contacts lost circulation zone 125 may no longer be exposed to sufficient shear force to remain fluid and once static, lost circulation treatment fluid 122 may thicken to seal lost circulation zone 125 and eventually set to form a hardened mass. The lost circulation treatment fluid 122 that does not contact a lost circulation zone 125 may then be circulated back to the surface, either with or without the presence of another fluid (e.g., drilling fluid) via an annulus 126 defined between the drill string 108 and the walls of the wellbore 116. At the surface, the recirculated or spent lost circulation treatment fluid 122 exits the annulus 126 and may be conveyed to one or more fluid processing unit(s) 128 via an interconnecting flow line 130. After passing through the fluid processing unit(s) 128, a "cleaned" lost circulation treatment fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

In embodiments, the lost circulation treatment fluid 122, which comprises the set-delayed cement compositions disclosed herein, may be added to a mixing hopper 134 communicably coupled to or otherwise in fluid communication with the retention pit 132. The mixing hopper 134 may include, but is not limited to, mixers and related mixing equipment known to those skilled in the art. In alternative embodiments, however, the lost circulation treatment fluid 122 may not be added to a mixing hopper. In at least one embodiment, for example, there could be more than one retention pit 132, such as multiple retention pits 132 in series. Moreover, the retention put 132 may be representative of one or more fluid storage facilities and/or units where the disclosed set-delayed cement compositions may be stored, reconditioned, and/or regulated until desired for use, e.g., as lost circulation treatment fluid 122.

As mentioned above, the disclosed lost circulation treatment fluid 122 which comprises the set-delayed cement compositions disclosed herein, may directly or indirectly affect the components and equipment of the drilling assembly 100. For example, the disclosed lost circulation treatment fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary lost circulation treatment fluid 122.

The lost circulation treatment fluid 122 may directly or indirectly affect the pump 120, which representatively includes any conduits, pipelines, trucks, tubulars, and/or pipes used to fluidically convey the lost circulation treatment fluid 122 downhole, any pumps, compressors, or motors (e.g., topside or downhole) used to drive the lost circulation treatment fluid 122 into motion, any valves or related joints used to regulate the pressure or flow rate of the lost circulation treatment fluid 122, and any sensors (i.e., pressure, temperature, flow rate, etc.), gauges, and/or combinations thereof, and the like. The disclosed lost circulation treatment fluid 122 may also directly or indirectly affect the mixing hopper 134 and the retention pit 132 and their assorted variations.

The disclosed lost circulation treatment fluid 122 may also directly or indirectly affect the various downhole equipment and tools that may come into contact with the lost circulation treatment fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed lost circulation treatment fluid 122 may also directly or indirectly affect any downhole heat exchangers, valves and corresponding actuation devices, tool seals, packers and other wellbore isolation devices or components, and the like associated with the wellbore 116. The disclosed set-delayed cement composition may also directly or indirectly affect the drill bit 114, which may include, but is not limited to, roller cone bits, PDC bits, natural diamond bits, any hole openers, reamers, coring bits, etc.

While not specifically illustrated herein, the disclosed lost circulation treatment fluid 122 may also directly or indirectly affect any transport or delivery equipment used to convey the lost circulation treatment fluid 122 to the drilling assembly 100 such as, for example, any transport vessels, conduits, pipelines, trucks, tubulars, and/or pipes used to fluidically move the lost circulation treatment fluid 122 from one location to another, any pumps, compressors, or motors used to drive the lost circulation treatment fluid 122 into motion, any valves or related joints used to regulate the pressure or flow rate of the lost circulation treatment fluid 122, and any sensors (i.e., pressure and temperature), gauges, and/or combinations thereof, and the like.

Figure 2:
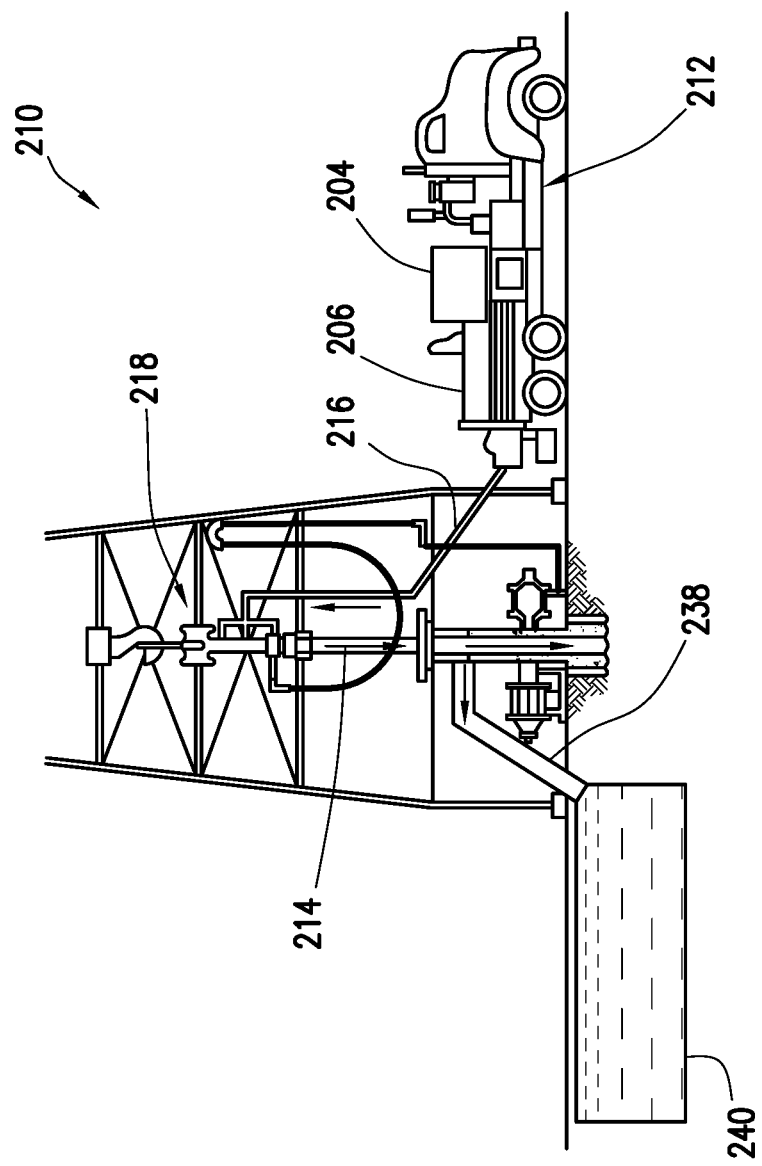
FIG. 2 illustrates surface equipment that may be used in the placement of a lost circulation treatment fluid into a lost circulation zone in a wellbore in accordance with certain embodiments.
Figure 3:
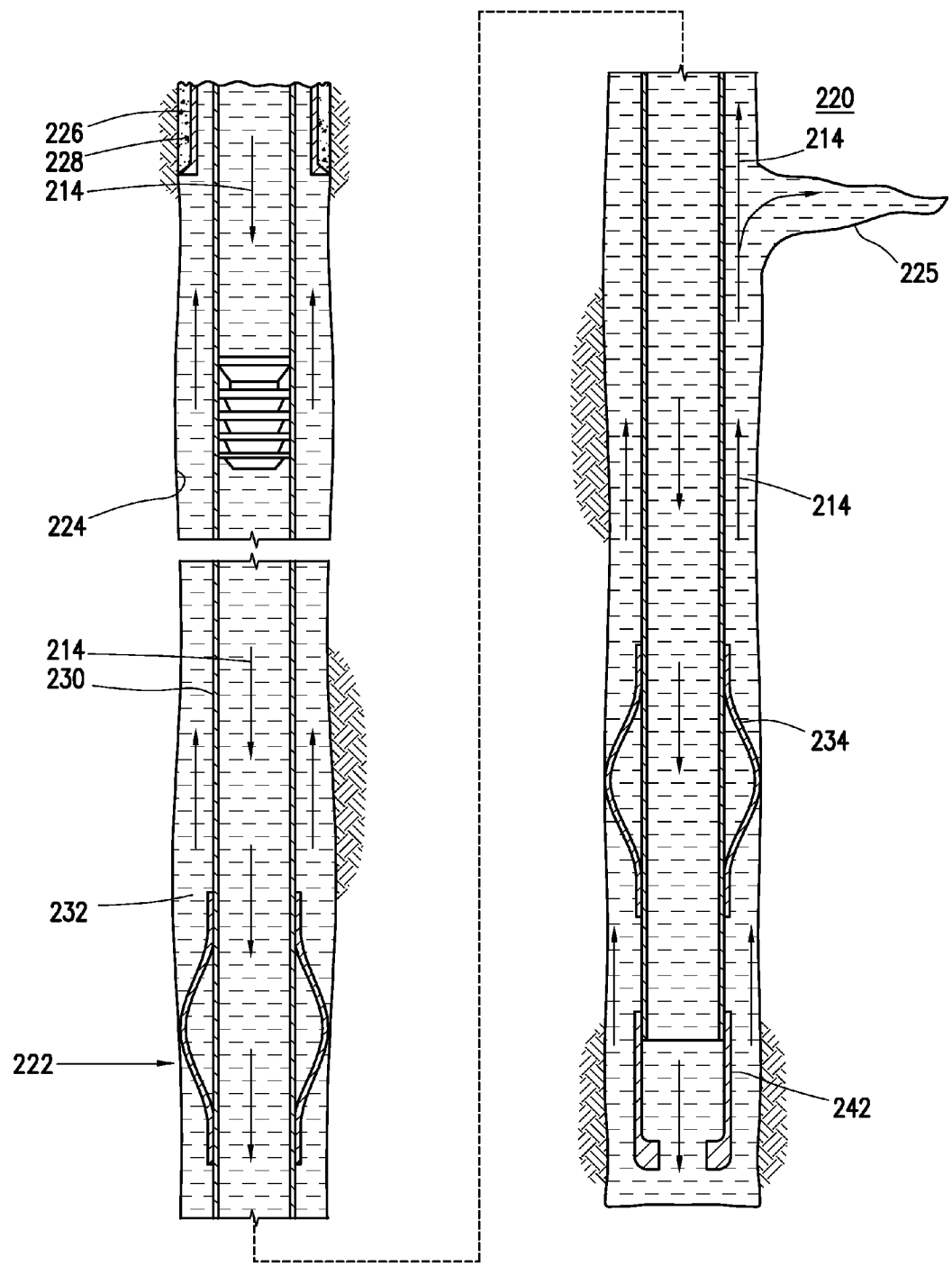
FIG. 3 illustrates the placement of a lost circulation treatment fluid into a lost circulation zone in a wellbore in accordance with certain embodiments.

FIGS. 2 and 3 illustrate an example technique for placing a lost circulation treatment fluid 214 comprising the set-delayed cement compositions disclosed herein into a lost circulation zone 225 while cementing equipment and casing are present in the wellbore 222. Such an embodiment may be used, for example, when it is desired to reduce the loss of displacement fluid into a lost circulation zone 225. FIG. 2 illustrates surface equipment 210 that may be used in placement of lost circulation treatment fluid 214 in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. Additionally, it should be noted that lost circulation treatment fluid 214 may be introduced prior to, concurrently with, or subsequent to the introduction of any other treatment fluid (e.g., a displacement fluid, competition fluid, etc.) into wellbore 222. As illustrated by FIG. 2, the surface equipment 210 may include a cementing unit 212, which may include one or more cement trucks. The cementing unit 212 may include mixing equipment 204 and pumping equipment 206 as will be apparent to those of ordinary skill in the art. The cementing unit 212 may pump lost circulation treatment fluid 214 through a feed pipe 216 and to a cementing head 218 which conveys the lost circulation treatment fluid 214 downhole.

Turning now to FIG. 3, the lost circulation treatment fluid 214, comprising the set-delayed cement compositions disclosed herein, may be placed into a subterranean formation 220 in accordance with example embodiments. As illustrated, wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224 with lost circulation zones 225. In the illustrated embodiment, a surface casing 226 has been inserted into the wellbore 222. The surface casing 226 may be cemented to the walls 224 of the wellbore 222 by cement sheath 228. In the illustrated embodiment, one or more additional conduits (e.g., intermediate casing, production casing, liners, etc.), shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 3, the lost circulation treatment fluid 214 may be pumped down the interior of the casing 230. The lost circulation treatment fluid 214 may be allowed to flow down the interior of the casing 230 through the casing shoe 242 at the bottom of the casing 230 and up around the casing 230 into the wellbore annulus 232. As the lost circulation treatment fluid 214 flows upward through the annulus 232, lost circulation treatment fluid 214 may contact lost circulation zones 225. If lost circulation treatment fluid 214 contacts a lost circulation zone 225, lost circulation treatment fluid 214 may flow into lost circulation zone 225 and may become static if sufficiently removed from a shear force. If static, lost circulation treatment fluid 214 may rapidly develop gel strength. Once sufficiently gelled, lost circulation treatment fluid 214 may then seal lost circulation zone 225 and prevent the loss of any treatment fluids (not shown) that subsequently flow adjacent to lost circulation zone 225. Over time, lost circulation treatment fluid 214 may be allowed to harden and set in lost circulation zone 225, for example, to form a cement sheath that supports and positions the casing 230 in the wellbore 222. While not illustrated, other techniques may also be utilized for introduction of the lost circulation treatment fluid 214. By way of example, reverse circulation techniques may be used that include introducing the lost circulation treatment fluid 214 into the lost circulation zone 225 by way of the wellbore annulus 232 instead of through the casing 230.

Any of the lost circulation treatment fluid 214 that does not contact a lost circulation zone 225 may exit the wellbore annulus 232 via a flow line 238 and be deposited, for example, in one or more retention pits 240 (e.g., a mud pit), as shown on FIG. 2.

As will be appreciated by those of ordinary skill in the art, embodiments of the set-delayed cement compositions may be used in a variety of cementing operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, addition of a cement set activator to the set-delayed cement composition.

In primary cementing embodiments, for example, embodiments of the set-delayed cement composition may be introduced into a space between a wall of a wellbore and a conduit (e.g., pipe strings, liners) located in the wellbore, the wellbore penetrating the subterranean formation. The set-delayed cement composition may be allowed to set to form an annular sheath of hardened cement in the space between the wellbore wall and the conduit. Among other things, the set cement composition may form a barrier, preventing the migration of fluids in the wellbore. The set cement composition also may, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening, such as a void or crack, in the formation, in a gravel pack, in the conduit, in the cement sheath, and/or a microannulus between the cement sheath and the conduit.

In embodiments, the set-delayed cement composition may be used for different subterranean operations. In embodiments, the set-delayed cement composition may be used for one or more subterranean operations at a specific worksite. As discussed above, the set-delayed cement composition may serve as a treatment fluid for these different subterranean operations. In embodiments, the set-delayed cement composition may be used as a lost circulation treatment fluid and when set as a cementing composition that may support and position a casing in a wellbore. In embodiments, the set-delayed cement composition may be reused or recirculated in the wellbore for the same or a different operation. The reusability of the set-delayed cement composition allows for the recycling of the set-delayed cement composition. Furthermore, this process reduces the amount of equipment and manpower needed between operations in regards to transitioning between operations, fluid handling, and fluid storage.

The exemplary set-delayed cement composition disclosed herein may directly or indirectly affect one or more components or pieces of equipment associated with the preparation, delivery, recapture, recycling, reuse, and/or disposal of the disclosed set-delayed cement composition. For example, the disclosed set-delayed cement composition may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement composition. The disclosed set-delayed cement composition may also directly or indirectly affect any transport or delivery equipment used to convey the set-delayed cement composition to a well site or downhole such as, for example, any transport vessels, conduits, pipelines, trucks, tubulars, and/or pipes used to compositionally move the set-delayed cement composition from one location to another, any pumps, compressors, or motors (e.g., topside or downhole) used to drive the set-delayed cement composition into motion, any valves or related joints used to regulate the pressure or flow rate of the set-delayed cement composition, and any sensors (i.e., pressure and temperature), gauges, and/or combinations thereof, and the like. The disclosed set-delayed cement composition may also directly or indirectly affect the various downhole equipment and tools that may come into contact with the set-delayed cement composition such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

Example 1

A sample lost circulation treatment fluid comprising a set-delayed cement composition was prepared. The sample comprised pumice (DS-325 lightweight aggregate), hydrated lime, Micro Matrix® cement retarder, and water. The compositional makeup of the sample is presented in Table 1 below:

TABLE 1

Compositional Makeup of Lost Circulation Treatment Fluid Example 1

| Component | Amount (kilograms) | % bwoP* |
|---|---|---|
| Pumice | 48.5 | 100.0 |
| Lime | 9.7 | 20.0 |
| Retarder | 0.61 | 1.25 |
| Co-Retarder | 0.24 | 0.50 |
| Water | 31.5 | 65.0 |
| Dispersant | 0.29 | 0.60 |
| Weighting Agent | 0.97 | 2.0 |

*bwoP = by weight of Pumice

The sample was aged at room temperature and rheology measurements were taken by a Model 35A Fann Viscometer equipped with a Fann Yield Stress Adapter (FYSA) and a No. 1 spring, in accordance with the procedure set forth in API RP Practice 10B-2, *Recommended Practice for Testing Well Cements*. The measurements were used to calculate the shear-thinning index (n) of the sample as it aged using the Herschel-Bulkley fluid model as discussed above. The results of this test are set forth in Table 2 below.

TABLE 2

Shear-Thinning Index of Lost Circulation Treatment Fluid Example 1

| Fluid Age (Days) | Yield Stress (lb/100 ft$^2$) | Shear-Thinning Index |
|---|---|---|
| 0 | 8.4 | 0.91 |
| 1 | 14.5 | 0.65 |
| 4 | 21.2 | 0.74 |
| 5 | 28.0 | 0.84 |
| 7 | 29.2 | 0.88 |
| 10* | 2.1 | 0.78 |
| 12 | 10.1 | 0.80 |

*0.1% dispersant added by weight of Pumice

Additionally 3 separate samples were removed and additional testing parameters, either the addition of a cement set activator or an increase in temperature, were performed on each sample. The results of these test are set forth in Table 3 below.

TABLE 3

Shear-Thinning Index of Lost Circulation Treatment Fluid Example 1

| Fluid Age (Days) | Yield Stress (lb/100 ft$^2$) | Shear-Thinning Index | Temperature | Activator |
|---|---|---|---|---|
| 7 | 4 | 0.74 | — | 10% CaCl$_2$ |
| 8 | 35.8 | 0.61 | 140° F. | — |
| 8 | 14.7 | 0.59 | 180° F. | — |

The results indicate that the lost circulation treatment fluid sample exhibits shear-thinning behavior over a span of 12 days. Furthermore, the sample remains shear-thinning even in the presence of a cement set activator or at elevated temperatures.

The original sample was portioned into three portions and tested with three different cement set activators to measure compressive strength. The three different cement set activators were sodium hexametaphosphate-1 (SHMP-1), sodium hexametaphosphate-2 (SHMP-2), and a 10% calcium chloride solution. The formulations for the SHMP activators are described in Table 4 below. The samples were then poured into 2" by 4" plastic cylinders and cured for 24 hours at 140° F. in a water bath. After the samples were cured, the destructive compressive strength was measured by using a mechanical press to crush the samples in accordance with the procedure set forth in API RP Practice 10B-2, *Recommended Practice for Testing Well Cements*. The results are presented in Table 5 below.

TABLE 4

SHMP Cement Set Activator Formulations

| | SHMP-1 | | SHMP-2 | |
|---|---|---|---|---|
| Component | Amount | % bw | Amount | % bw |
| SHMP | 62.7 g | 5.50% | 62.7 g | 5.50% |
| Sodium Sulfate | 62.7 g | 5.50% | 62.7 g | 5.50% |
| Dispersant | 15 g | 1.32% | 7.5 g | 0.66% |
| Water | 1 kg | 87.69% | 1.0 kg | 87.69% |

TABLE 5

Compressive Strength Values (psi) of Lost Circulation Treatment Fluid Example 1

| Activator % bwoP | Avg. CS (psi) |
|---|---|
| 2% SHMP-1 | 757.0 |
| 2% SHMP-2 | 677.5 |
| 10% CaCl$_2$ | 193.5 |

The results indicate that the lost circulation treatment fluid sample exhibits good compressive strength values, particularly with the SHMP cement set activators and thus may serve the purpose of supporting a well structure in addition to stopping lost circulation.

Example 2

A sample lost circulation treatment fluid comprising a set-delayed cement composition was prepared. The sample comprised pumice (DS-325 lightweight aggregate), hydrated lime, Micro Matrix® cement retarder, and water. The compositional makeup of the sample is presented in Table 6 below:

TABLE 6

Compositional Makeup of Lost Circulation Treatment Fluid Example 2

| Component | Amount (kilograms) | % bwoP* |
|---|---|---|
| Pumice | 500.0 | 100.0 |
| Lime | 100.0 | 20.0 |
| Retarder | 6.25 | 1.25 |
| Co-Retarder | 2.50 | 0.50 |
| Water | 300.0 | 60.0 |
| Dispersant | 3.0 | 0.60 |
| Weighting Agent | 10.0 | 2.0 |

*bwoP = by weight of Pumice

The sample was aged at room temperature and rheology measurements were taken by a Model 35A Fann Viscometer equipped with a Fann Yield Stress Adapter (FYSA) and a No. 1 spring, in accordance with the procedure set forth in API RP Practice 10B-2, *Recommended Practice for Testing Well Cements*. The measurements were used to calculate the shear-thinning index (n) of the sample as it aged using the Herschel-Bulkley fluid model as discussed above. The results of this test are set forth in Table 7 below.

TABLE 7

Shear-Thinning Index of Lost Circulation Treatment Fluid Example 2

| Fluid Age (Days) | Yield Stress (lb/100 ft$^2$) | Shear-Thinning Index |
|---|---|---|
| 2 | 17.6 | 0.51 |
| 7 | 22.4 | 0.98 |
| 14 | 17.2 | 0.80 |
| 21 | 7.8 | 0.73 |

Additionally 3 separate samples were removed and additional testing parameters, either the addition of a cement set activator and an increase in temperature, were performed on each sample. The results of these tests are set forth in Table 8 below.

TABLE 8

Shear-Thinning Index of Lost Circulation Treatment Fluid Example 2

| Fluid Age (Days) | Yield Stress (lb/100 ft$^2$) | Shear-Thinning Index | Temperature | Activator |
|---|---|---|---|---|
| 7 | 1.2 | 0.57 | 134° F. | 10% CaCl$_2$ |
| 7 | 4.8 | 0.19 | 134° F. | 2% SHMP/NaSO$_4$ |
| 14 | 7.4 | 0.48 | 183° F. | 10% CaCl$_2$ |

The results indicate that the lost circulation treatment fluid sample exhibits shear-thinning behavior over a span of 21 days. Furthermore, the sample remains shear-thinning even in the presence of a cement set activator and at elevated temperatures.

The sample was then aged over a 35 day period and introduced to either a CaCl$_2$ or SHMP/NaSO$_4$ cement set activator. Portions of the samples were taken at regular time points and their compressive strength was measured. The samples were then poured into 2" by 4" brass cylinders and cured for 24 hours at 134° F. in a water bath. After the samples were cured, the destructive compressive strength was measured by using a mechanical press to crush the samples in accordance with the procedure set forth in API RP Practice 10B-2, *Recommended Practice for Testing Well Cements*. The results are presented in Table 9 below.

TABLE 9

Compressive Strength Values (psi) of Lost Circulation Treatment Fluid Example 2

| Fluid Age (Days) | 10%* CaCl$_2$ | 2%* SHMP/NaSO$_4$ |
|---|---|---|
| 0 | <50 | 108 |
| 1 | <50 | 380 |
| 2 | <50 | 552 |
| 7 | — | 485 |
| 14 | 30 | 705 |
| 21 | 35 | 513 |
| 28 | 358 | 899 |
| 35 | 22 | 440 |

*bwoP = by weight of Pumice

The results indicate that the lost circulation treatment fluid sample exhibits good compressive strength values, particularly with the SHMP/NaSO$_4$ cement set activator and thus may serve the purpose of supporting a well structure in addition to stopping lost circulation.

Example 3

Two sample lost circulation treatment fluids comprising a set-delayed cement composition were prepared. The samples comprised pumice (DS-325 lightweight aggregate), hydrated lime, Micro Matrix® cement retarder, and water. To the experimental sample, a 33% aluminum sulfate solution was added. The control sample did not comprise any aluminum sulfate solution. The compositional makeup of the samples are presented in Table 10 below:

TABLE 10

Compositional Makeup of Lost Circulation Treatment Fluid Example 3

| Component | Amount (grams) | % bwoP* |
|---|---|---|
| Pumice | 271.8 | 100.0 |
| Lime | 54.1 | 20.0 |
| Retarder | 3.24 | 1.25 |
| Co-Retarder | 0.68 | 0.25 |
| Water | 163.1 | 60.0 |
| Dispersant | 1.55 | 0.60 |
| Weighting Agent | 5.4 | 2.0 |
| Viscosifier | 0.08 | 0.035 |
| 33% Aluminum Sulfate | 6.3 | 2.3 |

*bwoP = by weight of Pumice,
**Al$_2$(SO$_4$)$_3$ was only added to the experimental sample The samples were aged at room temperature for 72 days. Rheological measurements were taken by a Model 35A Fann Viscometer equipped with a Fann Yield Stress Adapter (FYSA) and a No. 1 spring, in accordance with the procedure set forth in API RP Practice 10B-2, *Recommended Practice for Testing Well Cements*. The results are presented in Table 11 below.

TABLE 11

Rheological Measurements

| Sample | RPM | | | | | | | |
|---|---|---|---|---|---|---|---|---|
| | 3 | 6 | 100 | 200 | 300 | 600 | 3D | 6D |
| Control | 1 | 1 | 8 | 16.5 | 26 | 66 | 0.5 | 0 |
| Experimental | 30 | 31 | 44.5 | 54.5 | 66 | 105 | 20 | 18 |

The measurements were used to calculate the shear-thinning index (n) of the samples as they aged using the Herschel-Bulkley fluid model as discussed above. The results of this test are set forth in Table 12 below.

TABLE 12

Shear-Thinning Index of Lost Circulation Treatment Fluid Example 3

| Sample | Fluid Age (Days) | Yield Stress (lb/100 ft$^2$) | Shear-Thinning Index |
|---|---|---|---|
| Experimental | 72 | 0.8 | 0.19 |
| Control | 72 | 29 | 1.11 |

These results indicate that the aluminate solution greatly increases the duration that the fluid exhibits shear-thinning behavior.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of preparing a lost circulation treatment fluid, the method comprising:
    mixing a set-delayed composition comprising:
        pumice,
        hydrated lime,
        a dispersant comprising a polycarboxylated ether dispersant,
        a set retarder comprising a phosphonic acid derivative, and
        water;
    storing the set-delayed composition for at least about one day or longer; and
    activating the set-delayed composition to produce the lost circulation treatment fluid, the activating comprising:
    mixing the set-delayed composition with a cement set activator wherein the cement set activator comprises an aqueous solution of calcium chloride.

2. The method of claim 1 wherein the lost circulation treatment fluid has a shear-thinning index of less than 1 as calculated by the Herschel-Bulkley model.

3. The method of claim 1 wherein the set delayed composition further comprises aluminum sulfate.

4. The method of claim 1 wherein the set retarder further comprises at least one retarder selected from the group consisting of a phosphonic acid, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

5. The method of claim 1 wherein the dispersant further comprises a sulfonated-formaldehyde-based dispersant.

6. The method of claim 1 wherein the cement set activator further comprises at least one cement set activator selected from the group consisting of triethanolamine, sodium silicate, zinc formate, calcium acetate, sodium hydroxide, sodium sulfate, nanosilica, sodium hexametaphosphate, and any combinations thereof.

7. The method of claim 1 wherein the lost circulation treatment fluid has a density in the range of from about 8 lb/gal to about 17 lb/gal.

8. A method of preparing a lost circulation treatment fluid, the method comprising:
    mixing a set-delayed composition comprising:
        pumice,
        hydrated lime,
        a dispersant comprising a polycarboxylated ether dispersant,
        a set retarder comprising a phosphonic acid derivative, and
        water;
    storing the set-delayed composition for at least about one day or longer; and
    activating the set-delayed composition to produce the lost circulation treatment fluid, the activating comprising:
    mixing the set-delayed composition with a cement set activator wherein the cement set activator comprises an aqueous solution of calcium chloride;
    wherein the lost circulation treatment fluid has a shear-thinning index of less than 1 as calculated by the Herschel-Bulkley model,
    wherein the lost circulation treatment fluid has a static gel strength of at least about 100 lb/100 ft$^2$ at a temperature of about 50° F. to about 200° F.

9. The method of claim 8 wherein the set-delayed composition further comprises aluminum sulfate.

10. The method of claim 8 wherein the set retarder further comprises at least one retarder selected from the group consisting of a phosphonic acid, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

11. The method of claim 8 wherein the dispersant further comprises a sulfonated-formaldehyde-based dispersant.

12. The method of claim 8 wherein the cement set activator further comprises at least one cement set activator selected from the group consisting of triethanolamine, sodium silicate, zinc formate, calcium acetate, sodium hydroxide, sodium sulfate, nanosilica, sodium hexametaphosphate, and any combinations thereof.

13. The method of claim 8 wherein the set-delayed cement composition is capable of remaining in a pumpable fluid state for about 1 day or longer at a temperature of about 100° F.

14. The method of claim 8 wherein the lost circulation treatment fluid has a static gel strength of at least about 500 lb/100 ft$^2$ at a temperature of about 50° F. to about 200° F.

15. A lost circulation treatment fluid comprising:
    a set-delayed composition comprising:
        pumice,
        hydrated lime, wherein the hydrated lime is present in a pumice-to-hydrated-lime weight ratio of about 3:1 to about 5:1,
        a polycarboxylated ether dispersant,
        a phosphonic acid derivative set retarder,
        aluminum sulfate, and
        water;

a cement set activator comprising:
  calcium chloride and water;
wherein the lost circulation treatment fluid has a shear-thinning index of less than 1 as calculated by the Herschel-Bulkley model,
wherein the lost circulation treatment fluid has a static gel strength of at least about 100 lb/100 ft$^2$ at a temperature of about 50° F. to about 200° F.

* * * * *